United States Patent
Shepherd et al.

(10) Patent No.: US 11,221,609 B2
(45) Date of Patent: Jan. 11, 2022

(54) DETERMINING OBJECT VOLUMES IN VIRTUAL OBJECT SPACE

(71) Applicant: HEWLETT-PACKARD DEVELOPMENT COMPANY, L.P., Houston, TX (US)

(72) Inventors: Matthew A. Shepherd, Vancouver, WA (US); Josh Shepherd, Vancouver, WA (US); Brent Ewald, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 784 days.

(21) Appl. No.: 16/076,111

(22) PCT Filed: Jul. 10, 2017

(86) PCT No.: PCT/US2017/041298
§ 371 (c)(1),
(2) Date: Aug. 7, 2018

(87) PCT Pub. No.: WO2019/013739
PCT Pub. Date: Jan. 17, 2019

(65) Prior Publication Data
US 2021/0200185 A1     Jul. 1, 2021

(51) Int. Cl.
*G05B 19/4099*   (2006.01)
*B33Y 50/00*     (2015.01)
*G06T 7/00*      (2017.01)

(52) U.S. Cl.
CPC ......... *G05B 19/4099* (2013.01); *B33Y 50/00* (2014.12); *G06T 7/0004* (2013.01);
(Continued)

(58) Field of Classification Search
CPC ...... G05B 19/4099; G05B 2219/49023; G05B 2219/35134; B33Y 50/00; G06T 7/0004; G06T 2207/30144
See application file for complete search history.

(56) References Cited

U.S. PATENT DOCUMENTS 7,177,453 B2   2/2007   Suryanarayanan et al.
7,315,304 B2   1/2008   Liang et al.
(Continued)

FOREIGN PATENT DOCUMENTS

EP        2549433 A1      1/2013
WO        WO-2016119899   8/2016

OTHER PUBLICATIONS

Wang et al., "Saliency-preserving Slicing Optimization for Effective 3D Printing", Computer Graphics Forum, vol. 33, No. 5, Retrieved from Internet: http://staff.ustc.edu.cn/~Igliu/Projects/2015_AdaptiveSlicing_3DPrinting/Papers/2015_CGF_AdaptiveSlicing.pdf, 2014, 12 pages.

*Primary Examiner* — Yuhui R Pan
(74) *Attorney, Agent, or Firm* — HP Inc. Patent Department

(57) ABSTRACT

In an example, a method includes acquiring, at a processor, object model data for an object to be generated in additive manufacturing, the object model data representing the object as a plurality of polygons. A virtual object space enclosing the object may be inspected from a plurality of discrete source points in a plane. For each of a plurality of distances from each source point, it may be determined if a polygon face is encountered, and if so, a counter may be set based on whether the polygon face is oriented towards the source point or away from the source point. Based on a content of the counter, it may be determined if a volume enclosed between two distances from a source point is a volume of the object.

20 Claims, 5 Drawing Sheets

(52) U.S. Cl.
CPC ............ *G05B 2219/35134* (2013.01); *G05B 2219/49023* (2013.01); *G06T 2207/30144* (2013.01)

(56) References Cited

U.S. PATENT DOCUMENTS

| | | | |
|---|---|---|---|
| 7,702,141 B2 | 4/2010 | Sirohey et al. | |
| 2008/0266293 A1* | 10/2008 | Cohen | G06T 13/40 345/424 |
| 2012/0065755 A1* | 3/2012 | Steingart | B33Y 30/00 700/98 |
| 2016/0049001 A1* | 2/2016 | Anderson | G06T 17/05 345/419 |

\* cited by examiner

DETERMINING OBJECT VOLUMES IN VIRTUAL OBJECT SPACE

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Figure 1:
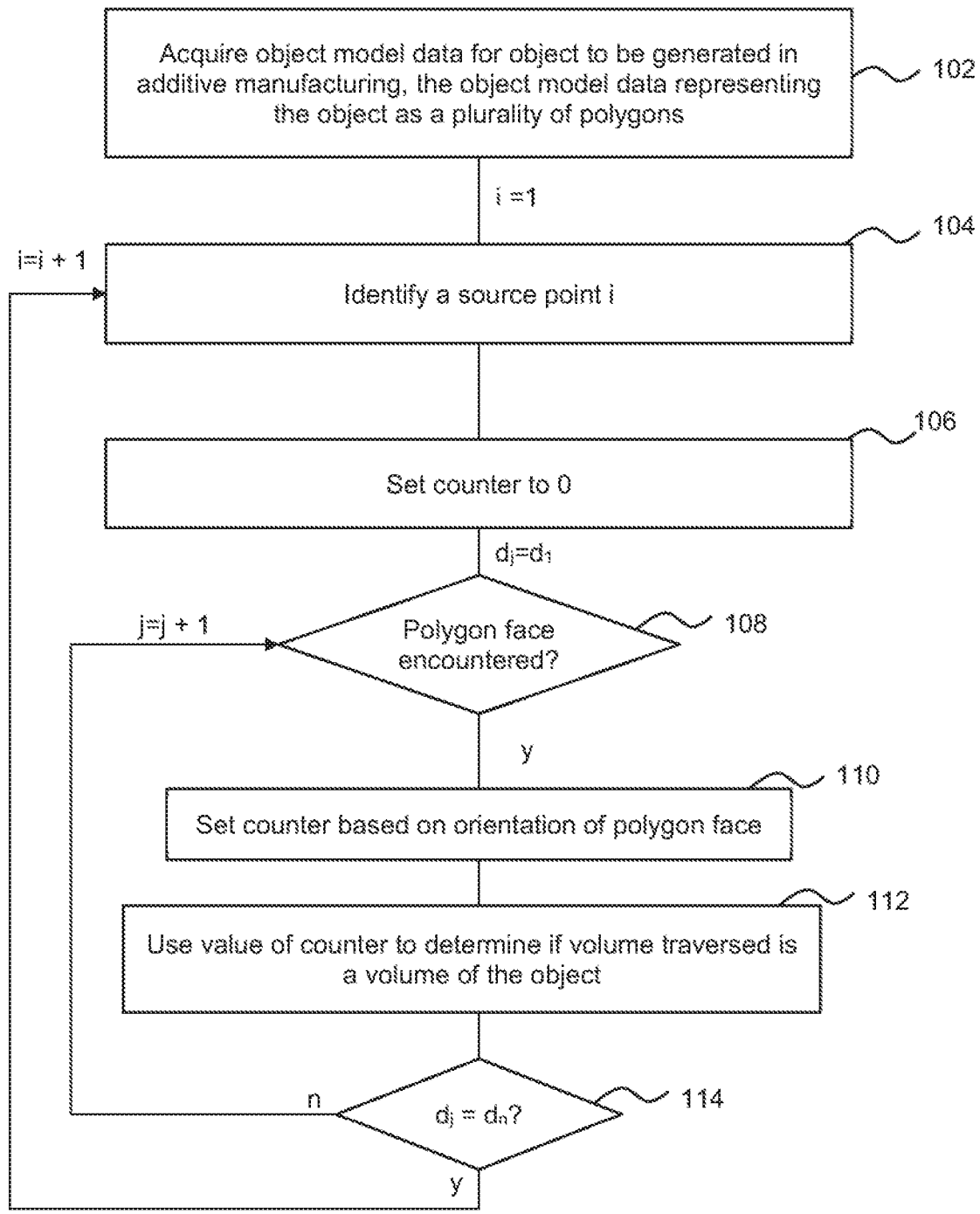
FIG. 1 is an example of a method for determining if a volume of a virtual object space is a volume of an object.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In some examples, a print agent may comprise a coalescence modifying agent, which acts to modify the effects of a fusing agent or energy applied for example by preventing, reducing or increasing coalescence or to assist in producing a particular finish or appearance to an object, and such agents may therefore be termed detailing agents. A property modification agent, for example comprising a dye, colorant, a conductive agent, an agent to provide transparency or elasticity or the like, may in some examples be used as a fusing agent or a modifying agent, and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

In some examples, the slice of the object model may be one 'voxel' thick. In some examples of additive manufacturing, three-dimensional space may be characterised in terms of such voxels, i.e. three-dimensional pixels, wherein each voxel occupies or represents a discrete volume. In some examples, the voxels are determined bearing in mind the print resolution of a print apparatus, such that each voxel represents a volume which may be uniquely addressed when applying print agents, and therefore the properties of one voxel may vary from those of neighbouring voxels. In other words, a voxel may correspond to a volume which can be individually addressed by a print apparatus (which may be a particular print apparatus, or a class of print apparatus, or the like) such that the properties thereof can be determined at least substantially independently of the properties of other voxels. For example, the 'height' of a voxel may correspond to the height of a layer of build material. In some examples, the resolution of a print apparatus may exceed the resolution of a voxel, i.e. a voxel may comprise more than one print apparatus addressable location. In general, the voxels of an object model may each have the same shape (for example, cuboid or tetrahedral), but they may in principle differ in shape and/or size. In some examples, voxels are cuboids based on the height of a layer of build material (which may for example be around 80 μm in some examples). For example, the surface area may be around 42 by 42 μm. In some examples, in processing data representing an object, each voxel may be associated with properties, and/or with print instructions, which apply to the voxel as a whole.

FIG. 1 shows an example of a method which may be a computer implemented method, for example carried out using at least one processor, and may comprise a method of identifying volumes (e.g. individually print addressable volumes, or voxels) of a virtual object space which comprise part of a virtual object (i.e. an object represented in object model data) within the virtual object space.

Block 102 comprises acquiring, at a processor, object model data for an object to be generated in additive manufacturing, the object model data representing the object as a plurality of polygons. The data may for example be held in or received from a memory, received over a network, received over a communications link or the like, or acquired in some other way, for example being derived by the processor. In some examples, the data may represent slices of the object. In some such examples, the slices of the object may be one 'voxel' thick, and/or have a thickness corresponding to a thickness of a layer of a layer by layer additive manufacturing process. The object model data may define a three-dimensional geometric model of at least a portion of the model object, including the shape and extent of all or part of an object in a three-dimensional co-ordinate system, e.g. the solid portions of the object. The data model represents the object (in some examples, surfaces thereof) as a plurality of polygons, in what may be described as a 'mesh model'. The polygons may be of a common type, for example, comprising triangles. The object model data may for example be generated by a computer aided design (CAD) application.

In some examples, the object model data may comprise object property data specifying object properties, for example to define at least one object property for the three-dimensional object to be generated. In one example, the object property data may comprise any or any combination of visual and/or mechanical properties, for example a color, flexibility, elasticity, rigidity, surface roughness, porosity, inter-layer strength, density, conductivity and the like for at least a portion of the object to be generated. Object property data may define multiple object properties and/or the object properties may vary over the object, for example such that different portions of an object may have multiple properties which may differ between portions.

In some examples the object properties may be specified as a 2D or 3D map of a property over the surface of the object. This may for example comprise a 'texture map'. A 2D texture map is a two-dimensional image file that can be applied to the surface of a 3D model to add color, texture, or other surface detail like glossiness, reflectivity, or transparency. In some examples, texture maps are created to correspond to an 'unwrap' model of a mesh surface, in which the polygons are arranged so as to lie in a 2D plane, and may be described by a uv coordinate system (as compared to the xyz coordinate system used to describe the object in 3D). Therefore a texture map may be associated with an object surface so as to correspond with the uv coordinates of an unwrapped 3D model.

For example, coordinates in a 2D property map associated with the surfaces of the object as defined by the polygons may be associated with the vertices (i.e. corners) of the polygons of the surface. In some examples, a model of an object may be expressed in two parts: (a) object model data representing the object as a plurality of initial polygons, i.e. a mesh, which has 3D rectilinear coordinates in xyz and (b) object property data, e.g. bitmap(s), which have 2D rectilinear coordinates in uv (the uv space is effectively the bitmap xy space, but is termed uv to avoid confusion with the 3D coordinate system). In some examples, the mesh may represent the surfaces of the object.

In one example, the polygon mesh is a triangular mesh and each triangle in the mesh has three vertices and six pieces of information—the xyz coordinates v0, v1 and v2 (the location of the polygon vertices in 3D space) and the uv coordinates uv0, uv1, and uv2 (the location of the vertices in the 2D space of the bitmap(s)). The uv coordinates may not have the same shape as the xyz coordinates, they can be three arbitrary points (or even the same point(s)) on the bitmap(s)). Further, they can be independently determined for each polygon, where one polygon's uv coordinates in general do not affect any other polygon's uv coordinates. In this way, the properties at the vertices are given by the uv coordinates. For the remainder of a given polygon (the edges and interior), the properties may be interpolated, for example linearly, from the uv values for the vertices.

While the example of a triangle has been used here, the mesh may be based on a different polygon, and/or may comprise example comprising a tetrahedral mesh made up of polygons. In such meshes, the properties may again be defined at the vertices.

In other examples properties may be mapped to an object model in a different manner, for example, each polygon may have a particular fixed property, or the like.

Block 104 comprises identifying a source point i, wherein in an example initially i=1. This is a source point for inspection, by the processor, of a virtual object space enclosing the object. There may be n source points for inspection and in some examples, the source points may be spaced with a voxel spacing, such that each source point is associated with a different column of voxels in the virtual object space.

The virtual object space may for example comprise a model of build volume in which the object is to be generated, or may be any space enclosing an object, for example a 'boundary box' enclosing the object. By convention, layers may be formed in an xy plane and built up in the z direction. The plane comprising the source points may comprise an xy plane orthogonal to the z axis, for example aligned with a boundary face of the virtual object space. Thus, the plane may be parallel to an intended plane of the layers to be generated in additive manufacturing. Such an xy plane may be rasterised in to the plurality of discrete locations, and in some examples each discrete location corresponds to a different voxel.

Block 106 comprises setting a counter to a value, in this example 0, although in principle this may be arbitrary.

At a distance $d_j=d_1$ of $d_n$ from the source point, in block 108, it is determined if a polygon face has been encountered. In some examples $d_1$ may be one voxel spacing from the source point.

If a polygon is encountered, then block 110 comprises setting the counter based on whether the polygon face is oriented towards the source point or away from the source point. The orientation of the polygon face may be determined by determining the normal to the face using a dot product or the like. For example, the counter may be decremented by one if the polygon face is oriented towards the source point and incremented by one if the polygon face is oriented away from the source point (although other schemes may be utilised in other examples). This convention may be reversed (the counter being decremented by one if the polygon face is oriented away from the source point), and/or the value of the increment/decrement may be arbitrary and a value other than one may be used in other examples.

Determining the normal to the face may for example be based on a convention. For example, a triangle face normal (for triangle ABC, in that order) throughout may be defined as a unit vector in the direction of the vector cross product $(B-A)\times(C-A)$, so as to provide a consistent definition of an outwards facing normal for a face. This may be used to establish a conventional "handedness". However, alternative conventions may be established and utilised to determine the orientation of the face of the polygon.

In some examples, the value of the counter is determined at each distance (e.g. at voxel resolution). In another example, the value of the counter is determined in 'floating-point space', which may allow a higher level of discrimination.

In block 112, the value of the counter is used to determine if the volume traversed is a volume of the object. For example, if the above example is followed, a face oriented towards the source point is indicative of entering the object and therefore if the counter is negative, the object has been entered and the volume transversed is a volume of the object. If the count is zero, the object has either not been entered yet, or a void in the object has been encountered, or the object has been fully traversed. Note, in some examples, objects may be nested such that the count may reach for example −2, −3 or some other negative integer. In some examples, there may be more than one face traversed in moving through the distance. For example, an object may be both entered and exited in the length of the distance. In such an example, the count may be incremented and then decremented. It may be noted that that the order of triangle processing (within the distance, e.g. the height of a voxel) is not important. If floating point space is used, the counter value may change within the distance considered.

Once the counter is set, or in the event that no polygon face was encountered at that distance, it is determined if the distance is do (block 114). If not, the distance is incremented in block 114. In this way, a volume enclosed between two distances may be considered in turn in order to categorise the volume. In some examples, the incrementation is by a spacing of one voxel, and the determination of whether the volume is a volume of the object is determined on a voxel-by-voxel basis. In examples where one or a plurality of polygons are encountered within one incremental distance, the categorisation of a voxel may be determined according to a convention; for example, the count on exit of, or entry to, the voxel may determine the categorisation of the voxel, or there may be a fractional count and/or a separate classification may be applied. In some examples, the classification of such voxel may be context based (for example, based on surrounding voxels and/or the classification may be referred to a user for determination or review. In some examples, the distances between the counter increments may be determined by planes dividing an object model into slices. Such slices may be one voxel in thickness, which may be equivalent to one layer in a layer by layer additive manufacturing process.

The process then loops back to block 108 with the new distance ($d_j=d_{j+1}$) until it is determined in block 114 that d has been reached.

Once $d_n$ is reached (which may be an indication that the full length of the virtual object space from that source point has been inspected), the source point is changed to i=i+j and the method loops back to block 104. This may continue until all source points have been inspected.

It will be appreciated that, while in the example of FIG. 1, a column is traversed at each location, this need not be the case. For example, each model slice (or intended layer of the object) may be inspected before moving on to the next slice, or the inspections may be ordered in some other way.

In some examples, the method may be carried out on a 'polygon by polygon' basis, with each polygon facing the plane comprising the source points of the inspections being rasterised into xy locations and the columns of voxels associated with those locations being inspected in turn.

In some examples, rather than an association being made in block 112, a 'codeword' may be built up, the codeword containing the values for voxels, for example arranged in a slice-wise or column wise manner. The determination of the association may then be made a later stage based on the codeword.

Thus, such a method allows print addressable volumes (voxels) of a virtual object space to be categorised as being part of, or outside, an object through utilisation of a counter.

Figure 2:
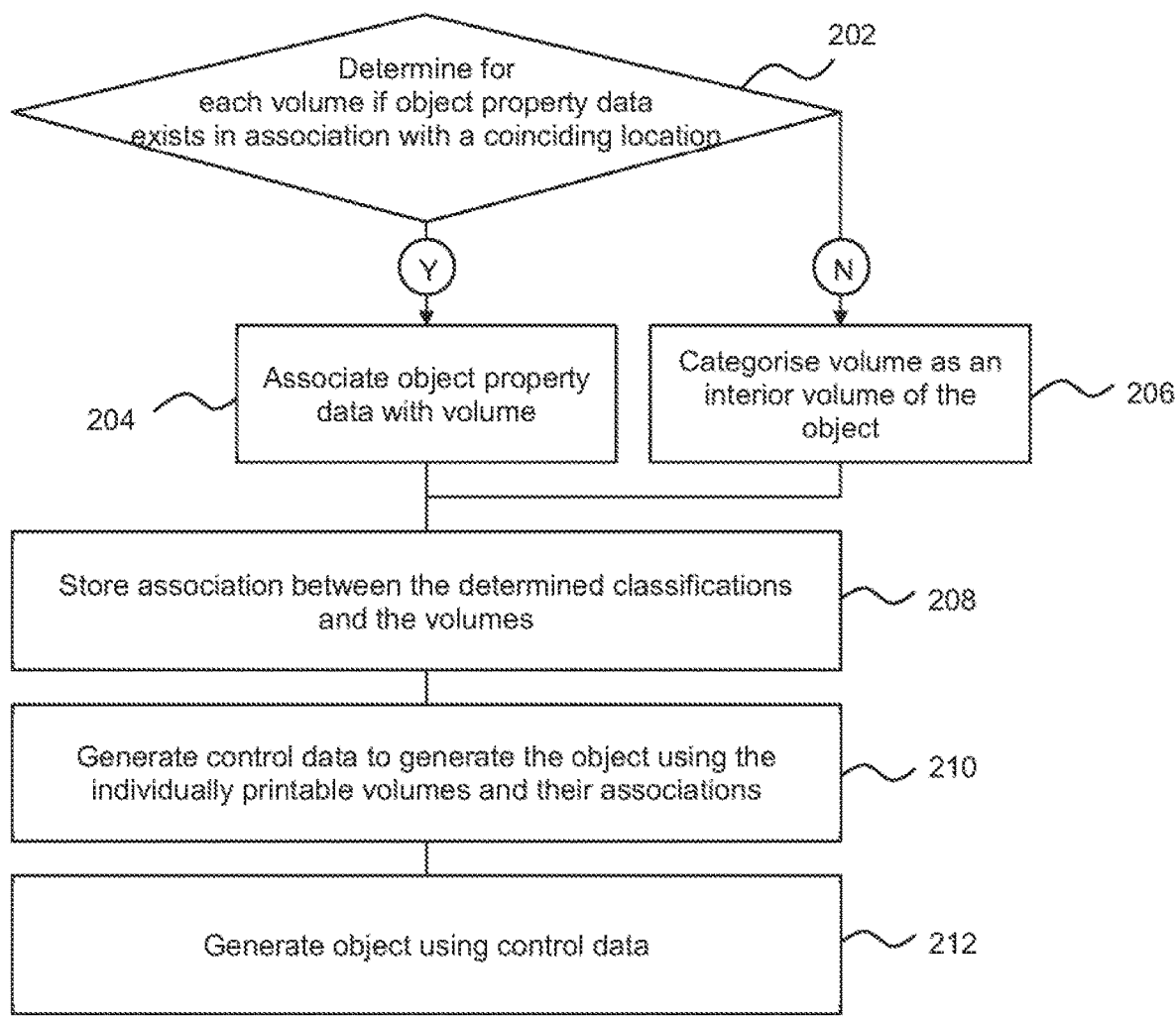
FIG. 2 is an example of a method of generating an object.

FIG. 2 is an example of a method, which may be a method of generating an object. In this example, the method may follow on from the example of FIG. 1, in which the print addressable volumes (the voxels) of the virtual object space have been categorised as being part of the object or being outside an object.

In this example, in block 202, it is determined, for each volume of the object, if object property data exists in association with a location coinciding with that volume of the object. If this determination is positive, the method continues in block 204 by associating object property data with the volume, and the categorisation of the volume may remain unchanged (or in one example, in which properties are associated with the surfaces of the object and not the interior, the volume may be categorised as a surface volume). For example, this may comprise identifying voxels which are associated with a surface for which a texture map has been specified, and attributing the voxel with a property (for example, a color, transparency, conductivity or the like) taken or derived (e.g. interpolated) from the texture map for that location. If however the determination in block 202 is negative, i.e. there is no object property data associated with the volume, in this example, in block 206, the volume is categorised as an interior (i.e. non-surface) volume of the object. In other examples, properties may also be specified for an interior of an object and in such an example properties for the interior may be taken from volumetric specifications inside the solid. For example, the object may be modelled with an internal tetrahedral mesh that gives interior properties by tetrahedral interpolation of the properties given at its four vertices in much the same way as interpolation between the three vertices of a triangle, as discussed above, and the properties may for example be provided as a 3D texture map.

Such interior volumes/voxels may be processed differently to surface voxels. For example, there may be default print instructions associated with such voxels and identifying the extent to which such default print instruction may be applied may increase processing speed or reduce a burden on processing resources in subsequent processing steps.

By identifying the interior volumes/voxels, the specification of an object shell may be translated into a specification of a solid object. Moreover, in downstream processing of the data describing the object, the methods set out herein allow an unambiguously determination in voxel processing what is "object" and "not object". This can be used, for example, along with distance from the surface to determine how far "inside" or "outside" of the part a particular location is and modify processing (such as lowering the heat specification and/or fusing agent in a bulk region of an object, where heat may tend to build up, or layering surface properties differently inside and outside the of the part).

Once all the individually print addressable volumes have been categorised as (i) part of the object and associated with property data, (ii) part of the object and interior, or (iii) using the method of FIG. 1, as not part of the object, the method comprises storing an association between the determined classification and the volume in block 208. This association may be stored in a non-volatile manner.

Block 210 comprises generating control data to generate the object using the individually printable volumes and their associations. For example, a voxel at a given location may have at least one specified property associated thereto: for example, it may be an interior voxel, or may have a property such as a particular color, transparency, conductivity, strength or the like. A print agent or combination of print agents to provide a property, or a default print agent selection may be determined, for example each property or combination thereof may map, via a look-up table or the like to a print agent selection to apply to a location corresponding to a physical location corresponding to the print addressable volume. In some examples, a halftoning process may be used to determine where print agent drops may be applied (and in some examples, more than one drop and/or more than one print agent may be applied in a print addressable volume).

Block 212 comprises generating the object using the control data. For example, this may comprise forming successive layers of build material on a print bed and applying print agents according to the control instructions for that layer and exposing the layer to radiation, resulting in heating and fusion of the build material.

Figure 3:
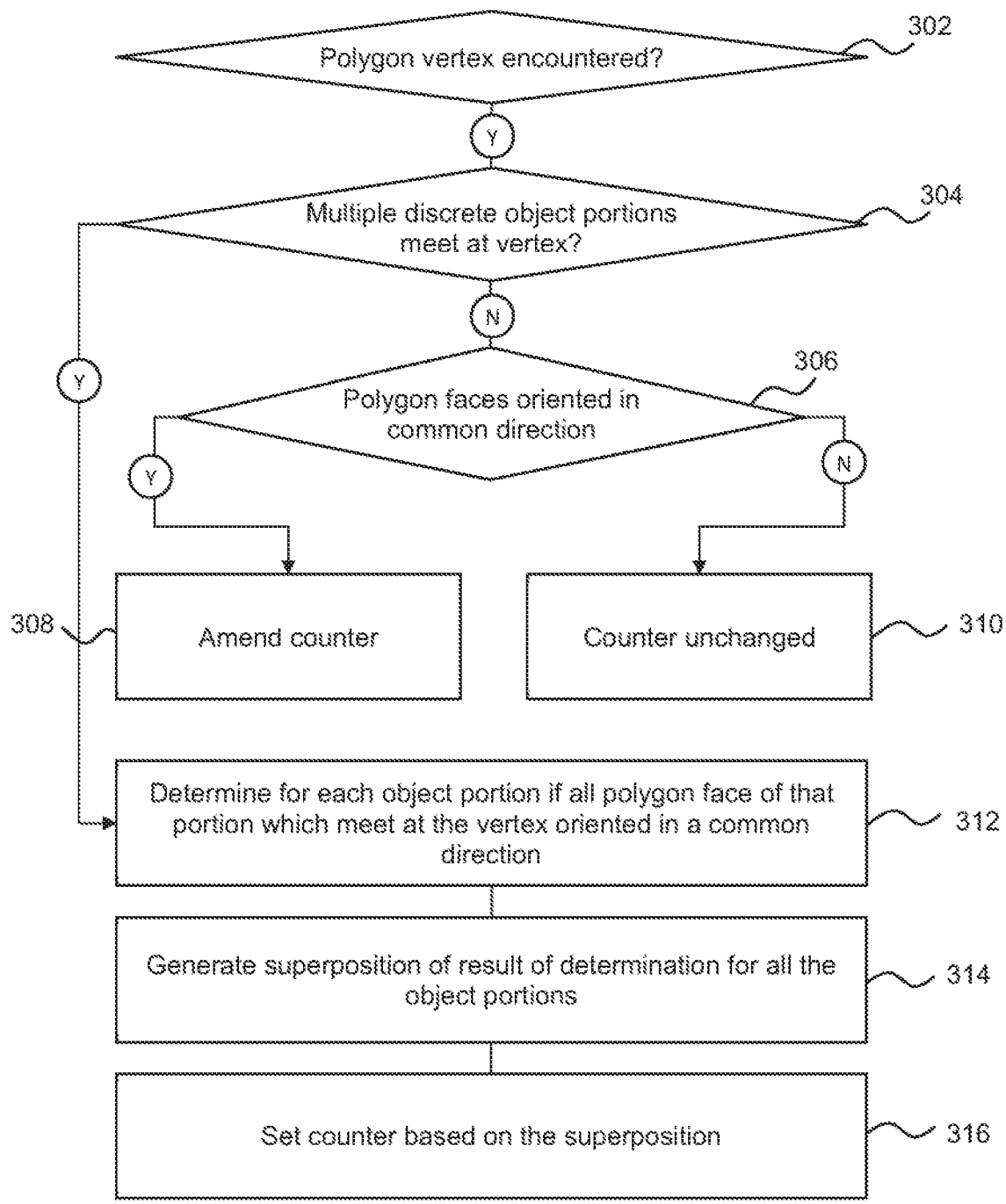
FIG. 3 is another example of determining if a volume of a virtual object space is a volume of an object.

FIG. 3 is an example of a method considering the case of a vertex being encountered by an inspection. In practice, this is unlikely but is a possible scenario.

In this example, the method comprises determining, in block 302, if a polygon vertex is encountered. If so, block 304 comprises determining if there are multiple discrete object portions meeting at the vertex.

If not, the method of FIG. 3 sets the counter based on whether polygon faces which meet at the vertex are oriented towards the source point or away from the source point. More particularly, in this example, block 306 comprises determining if all the polygon faces point in a common direction. If the determination is that the faces do point in a common direction (for example, all pointing towards the source point) in block 308 the counter is amended. If not (i.e. if some faces point towards the source point and some point away from the source point, the counter unchanged (block 310).

The rationale for leaving the counter unchanged is that this is an indication of 'skimming' an object: the vertex may be either a protruding vertex of an object, in which case the counter will likely indicate that the volume containing the vertex is outside the object, or a recess in the object, in which the counter will likely indicate that the volume containing the vertex is inside the object. In block 306, the counter may for example be changed to indicate that the object has been entered in the event that all the faces face toward the source point (e.g. decremented according to the example given above), and changed to indicate that the object has been exited in the event that all the faces face away the source point.

If the determination in block 304 was that there are multiple discrete object portions meeting at the vertex, this is treated as a separate case. It may be for example that one object portion is skimmed while another is entered or exited. This would give the result that not all faces are oriented in the same direction so if the process of blocks 306 to 310 was followed, the counter would remain unchanged, whereas in fact an object portion has been entered.

In order to prevent such a mischaracterisation, in this example, block 312 comprises determining for each object portion if all the polygon faces of that portion which meet at the vertex point face in a common direction. This may be determined on the basis that edges are shared in a common object portion but separate object portions do not share edges. In practice, this may be determined by selecting one face touching the vertex in turn and determining which faces touch the vertex and share an edge with the selected face. This may be iterated through those faces until all faces which touch the vertex and share an edge have been found. At that point, a new face (which will belong to a different object portion) may be used to find all the face touching the vertex and sharing an edge therewith, and so on until all object portions have been defined in terms of their faces.

The determination for each object portion may be made as described in block 306 to 310, with a counter being changed depending on whether the faces are oriented in a common direction, and based on that direction, or left unchanged where faces are oriented in different directions.

Block 314 comprise generating a superposition of the result of the determination for the object portions. For example, this may comprise a sum of the results: if one object portion is being entered, this may for example indicated that the counter should be decremented by 1 (i.e. the counter changes by −1), but if the other object portion is skimmed, there is no change from that portion, thus the supposition is −1.

Block 316 comprises setting the counter based on the superposition. Therefore, if two or more object portions were skimmed, the counter would remain unchanged. If any object portion was exited and another object portion immediately entered, then the count would also remain unchanged (which is correct as the previous count would have indicated that the voxel was part of an object and this is also the correct allocation for the volume of interest).

In another example, if a polygon edge is encountered, the counter may be incremented or decremented by a 'half count' compared to the count if a face is encountered. This may be an appropriate increment given that an edge is shared between exactly two triangles: If an edge is struck, it will be struck twice at the same location, once for first triangle and once for the second triangle, so two edge strikes are exactly equivalent to one polygon strike. It may be noted that there is no absolute rule to how many triangles share a vertex, so a corresponding rule for vertices may be inappropriate.

Figure 4:
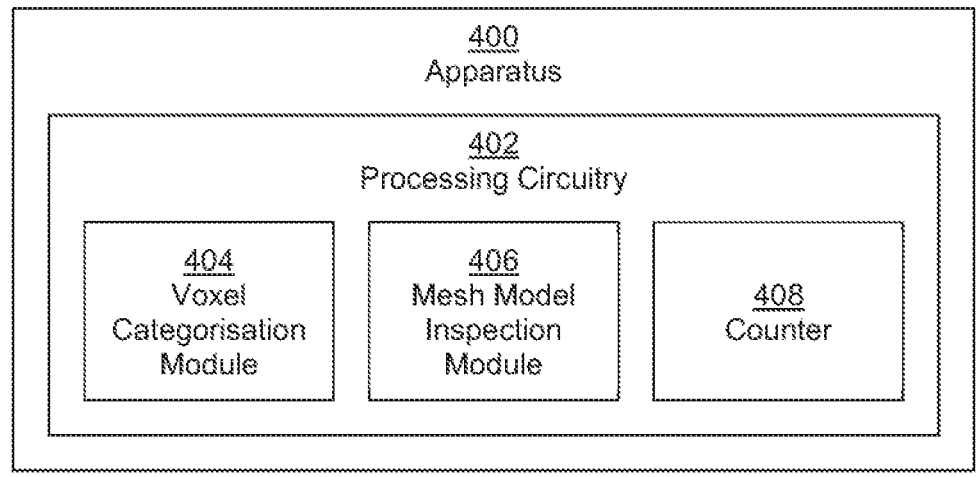
FIGS. 4 and 5 are examples of apparatus for processing data relating to additive manufacturing.

FIG. 4 is an example of an apparatus 400 comprising processing circuitry 402. In this example the processing circuitry 402 comprises a voxel categorisation module 404, mesh model inspection module 406 and a counter 408.

In use of the apparatus 400, the voxel categorisation module 404 is operable to selectively categorise a plurality of voxels in a virtual build volume comprising an object to be generated in additive manufacturing as voxels of the object or voxels outside the object. The mesh model inspection module 406 is operable to inspect a plurality of parallel voxel columns through the virtual volume comprising a mesh model of the object in a voxel-wise manner and to determine if a voxel within a column under inspection comprises at least one polygon face within the mesh model. The counter 408 stores a value which is changed when a polygon face is contained within a voxel and wherein a change to the counter is based on whether the polygon face is oriented towards a source point of the inspection or away from the source point. The voxel categorisation module 404 uses the value of the counter at the location of a voxel to categorise the voxel. For example, this may utilise any of the methods discussed above.

Figure 5:
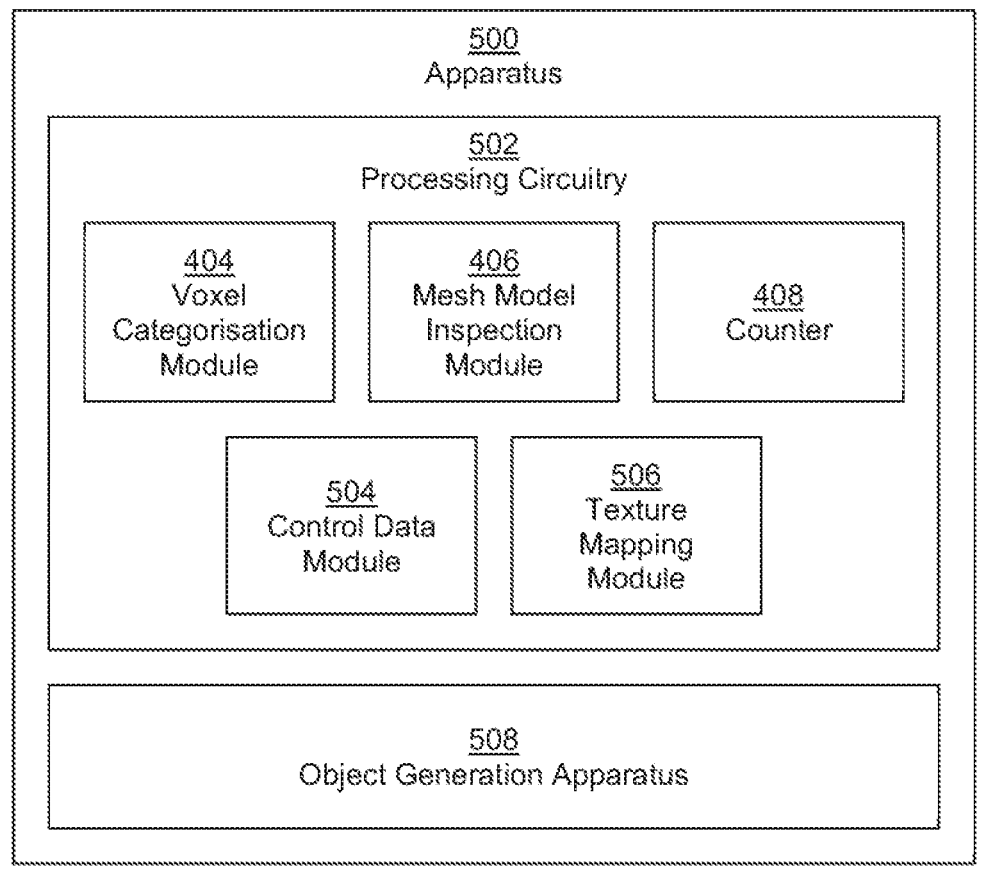

FIG. 5 shows an example of an apparatus 500 comprising processing circuitry 502 which comprises the voxel categorisation module 404, mesh model inspection module 406 and the counter 408 of FIG. 4, and further comprises a control data module 504 to generate control data to generate the slice of the object model and a texture mapping module 506 to assign a property value to a surface voxel of the object. The apparatus 500 further comprises object generation apparatus 508 to generate the object in a plurality of layers corresponding to respective slices according to the control data.

In use of the apparatus 500, the control data module 504 generates control instructions for generating an object based on the representation of the object as a plurality of discrete voxels, some of which may have a property assigned thereto by the texture mapping module 506 and some of which may be categorised as internal voxels. For example, properties or combinations thereof may map, via a look-up table or the like to a print agent or print agent combination to apply to a location corresponding to the voxel. In some examples, a halftoning process may be used to determine where print agent drops may be applied within that location/voxel. For example, the apparatus 500 may utilise the methods discussed above in relation to FIG. 2.

The object generation apparatus 508 is to generate the object according to the control instructions, and may to that end comprise additional components such as print bed, build material applicators, print agent applicators, heat sources and the like, not described in detail herein.

Figure 6:
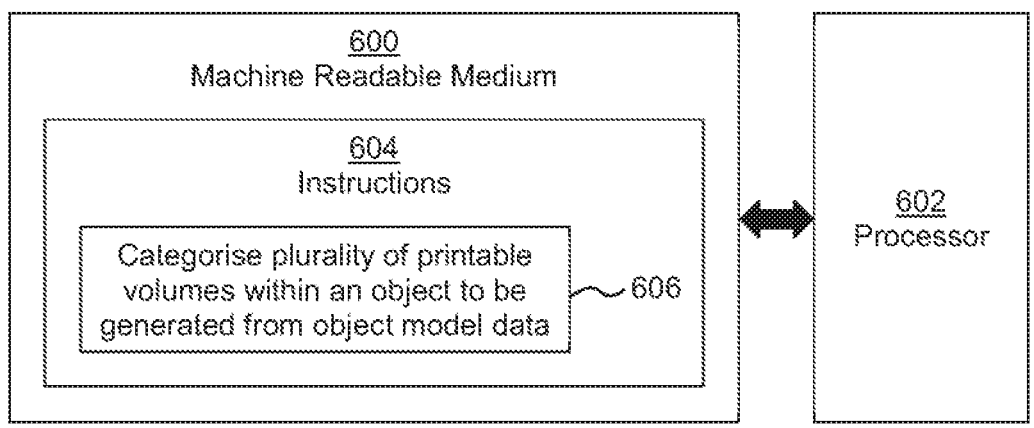
FIG. 6 is an example of a machine readable medium in association with a processor.

FIG. 6 is an example of a tangible, non-volatile, machine readable medium 600 in association with a processor 602. The machine readable medium 600 stores instructions 604 which may be stored in a non-volatile manner and which, when executed by the processor 602, cause the processor 602 to carry out processes. The instructions 604 comprise instructions 606 to categorise a plurality of printable volumes within an object to be generated in additive manufacturing from object model data representing the object as a plurality of polygons. The categorising comprises:

(i) inspecting a region (e.g. a virtual object space, or virtual build volume) enclosing the object from a plurality of discrete source points in a plane, each inspection corresponding to a column of printable volumes (e.g. voxels) and, for each of the printable volumes, determining if a polygon face is encountered within the volume, and if so, setting a counter based on whether the polygon face is oriented towards the source point of the inspection or away from the source point; and (ii) determining, based on a content of the counter, if a printable volume is a volume of the object.

In some examples, the instructions 604 may comprise instructions to cause the processor 602 to generate control instructions to generate an object using the categorised printable volumes.

In some examples, the instructions 604 may comprise instructions to cause the processor 602 to carry out at least one of the blocks of FIG. 1, 2 or 3, and/or to function as the processing circuitry 402, 502 of FIG. 4 or 5.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the voxel categorisation module 404, mesh model inspection module 406, counter 408, control data module 504 and/or texture mapping module 506) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   acquiring, at a processor, object model data for an object to be generated in additive manufacturing, the object model data representing the object as a plurality of polygons;
   inspecting, by the processor, a virtual object space enclosing the object from a plurality of discrete source points in a plane and, for each of a plurality of distances from each source point, determining if a polygon face is encountered, and if so, setting a counter based on whether the polygon face is oriented towards the source point or away from the source point;
   determining, based on a content of the counter, if a volume between two distances from the source point is a volume inside of the object; and
   generating the object using additive manufacturing based on control data including the determination of whether the volume is a volume within the object.

2. A method according to claim 1 in which each source point and a spacing between two distances is related to an individually printable volume, the method further comprising associating each determination with an individually printable volume and storing the association.

3. A method according to claim 2 further comprising generating control data to generate the object of the object using the individually printable volumes.

4. A method according to claim 1 wherein the inspecting comprises, for each source point, moving one voxel at a time away from the source point and determining at each move whether a polygon face is encountered.

5. A method according to claim 1 comprising decrementing the counter when a face which is oriented towards the source point is encountered and incrementing the counter when a face which is oriented away from the source point is encountered.

6. A method according to claim 1 further comprising determining if object property data exists in association with a location coinciding with a volume of the object and if so associating object property data with the volume and if not categorising the volume as an interior volume of the object.

7. A method according to claim 1 further comprising determining if a polygon vertex is encountered and if so, setting the counter based on whether polygon faces which meet at the polygon vertex are oriented towards the source point or away from the source point.

8. A method according to claim 7 further comprising determining if all the polygon faces which meet at the polygon vertex are oriented in a common direction and if so amending the counter and if not leaving the counter unchanged.

9. A method according to claim 7 further comprising determining if there are multiple discrete object portions meeting at the vertex and, if so:
   determining for each object portion if all the polygon faces of that portion which meet at the vertex are oriented in a common direction;
   generating a superposition of a result of the determination for the object portions; and
   setting the counter based on the superposition.

10. Apparatus comprising processing circuitry, the processing circuitry comprising:
    a voxel categorisation module to selectively categorise a plurality of voxels in a virtual build volume comprising an object to be generated in additive manufacturing as voxels of the object or voxels outside the object;
    a mesh model inspection module to inspect a plurality of parallel voxel columns through the virtual build volume comprising a mesh model of the object in a voxel-wise manner and to determine if a voxel within a column under inspection comprises a polygon face within the mesh model; and
    a counter, wherein the counter stores a value which is changed when a polygon face is contained within a voxel and wherein a change to the counter is based on whether the polygon face is oriented towards a source point of the inspection or away from the source point, wherein the voxel categorisation module is to use the value of the counter at a location of a voxel to categorise the voxel; and
    an output to an additive manufacturing system to provide the categorization of the voxel for use in forming the object.

11. Apparatus according to claim 10 wherein the processing circuitry further comprises a control data module to generate control data to generate the object, the control data based on the categorization of the voxel for each voxel categorized.

12. Apparatus according to claim 11 further comprising the additive manufacturing system comprising an object generation apparatus to generate the object in a plurality of layers according to the control data.

13. Apparatus according to claim 10 wherein the processing circuitry further comprises a texture mapping module to assign a property value to a surface voxel of the object.

14. A non-transitory machine readable medium comprising instructions which when executed by a processor cause the processor to:
    categorise a plurality of printable volumes within an object to be generated in additive manufacturing from object model data representing the object as a plurality of polygons, wherein said categorising comprises:
        inspecting a region enclosing the object from a plurality of discrete source points in a plane, each inspection corresponding to a column of printable volumes and, for each of the printable volumes,
        determining if a polygon face is encountered within the printable volume, and if so, setting a counter based on whether the polygon face is oriented towards the source point of the inspection or away from the source point;
        determining, based on a content of the counter, if a printable volume is a volume inside the object; and
        outputting control instructions to an additive manufacturing system to generate the object based on determination of whether the printable volume is within the object.

15. A machine readable medium according to claim 14 further comprising instructions which when executed by a processor cause the processor to:
    for each source point, move one voxel at a time away from the source point and determine at each move whether a polygon face is encountered.

16. A method according to claim 1 further comprising setting the counter to an initial value when identifying a first source point for the inspection.

17. A method according to claim 1 in which each of the plurality of source points is associated with a different column of voxels in the virtual object space.

18. A method according to claim 1 further comprising determining orientation of the polygon face using a dot or cross product.

19. A method according to claim 1 further comprising, when the counter returns to at an initial value, determining that a void in the object has been encountered.

20. A method according to claim 1 further comprising applying default print instructions to a volume determined to be interior to the object to increase processing speed as opposed to volumes on a surface of the object associated with specific print instructions.

* * * * *